United States Patent Office 3,806,349
Patented Apr. 23, 1974

3,806,349
CdS, Se CONTAINING INFRARED TRANSMITTING ZINC SILICATE GLASS
Takashi Matsuura, Akishima-shi, Japan, assignor to Hoya Glass Works, Limited, Tokyo, Japan
Continuation-in-part of abandoned application Ser. No. 40,552, May 26, 1970. This application Oct. 27, 1972, Ser. No. 301,519
Claims priority, application Japan, May 28, 1969, 44/41,473
Int. Cl. G03c 3/08, 3/24, 3/30
U.S. Cl. 106—54       4 Claims

ABSTRACT OF THE DISCLOSURE

An infrared transmitting glass having a transmission performance of cutting off substantially all visible rays while transmitting infrared rays in a manner of sharp cutting-off at an absorption cut-off limit located in a region of relatively long wave-lengths, consisting basically of the $SiO_2$-$ZnO$-$R_2O$-$R'O$ system (R represents an alkali metal and R' represents an alkaline earth metal) and including CdS and Se as coloring agents, wherein ZnO content is relatively high such as 28–48 percent by weight or more preferably over 31 percent by weight.

CROSS-REFERENCE TO THE RELATED APPLICATION

This application is a continuation-in-part of our earlier copending application Ser. No. 40,552, filed May 26, 1970, now abandoned.

BACKGROUND OF THE INVENTION

The present invention relates to a filter glass transmitting infrared rays with cutting off visible rays, and more particularly to an infrared transmitting glass which shows a sharp cutting-off performance in a region of relatively long wavelengths such as 750 m$\mu$ or longer.

The conventional infrared transmitting glasses containing CdS and Se as coloring agents have their absorption cut-off limit in a region of wavelength of about 690 to 700 m$\mu$ at the highest, and heretofore it has been difficult to produce a glass having the absorption cut-off limit in a region of much longer wavelengths. Thus, there has not been known any glass having a transmission property only in the range of above 750 m$\mu$. Here the absorption cut-off limit or transmission limit is expressed by the mean value of two wavelengths where the transmission ratios are 72 and 5 percent, respectively. Also it is noted that in the following description, the width of absorption cut-off is expressed by the difference between the two wavelengths of the transmission ratios of 72 and 5 percent.

Recently, infrared rays are widely used, for example, in the fields of infrared photograph, communication and the like. However, a glass having a transmission limit of 750 m$\mu$ or less has often been found unsuitable as a filter glass for the purpose of transmitting only infrared rays, because it also transmits a portion of visible rays. There have been known infrared transmitting glasses colored with manganese-chromium which can transmit a major portion of infrared rays with cutting off a minor portion of infrared rays as well as visible rays of up to the wavelength of not longer than 800 m$\mu$. However, these glasses have no sharp cut-off performance in the absorption cut-off range. For example, in case of a glass having a thickness of 2.5 mm. and the absorption cut-off limit of 900 m$\mu$, the width of absorption cut-off or the sharpness of cut-off is in excess of 200 m$\mu$. Such a glass gives an undersirable transmission of a portion of the visible rays in the region of longer wavelength, so that such a glass is not suited for use in applications requiring a more strictly limited infrared transmissibility. However, it was heretofore very difficult to produce a glass having a sharp cut-off performance which will satisfy a requirement for a strictly limited infrared transmissibility.

It is known that a glass having a desired infrared transmission property within the conventional range can be obtained by the CdS-CdSe colored glass by melting, cooling and properly heat-treating it at temperatures of around its softening point. In the CdS-CdSe colored glass, it is also well known that zinc oxide is an important component for retaining the color of the CdS-CdSe colored glass. In this connection, it has been conventionally believed that the amount of zinc oxide to be added should be limited within a moderate level such as 10 to 20 percent by weight based on the total basic glass composition, because if zinc oxide is added beyond that moderate level, it causes an evaporation of the coloring agents. So, for example, in the glass disclosed in Japanese patent publication No. 19,402/1968, which is also an infrared transmitting glass, the content of zinc oxide is in the range of 10 to 20 based on the total basic glass composition. Or in another known glass disclosed in French Pat. No. 1,490,974 which is a glass having a sharp cut-off performance though this glass is intended for absorbing ultra-violet rays, the content of zinc oxide is limited at most to be 30 percent by weight. Really, it is so noted in a text book entitled as "Coloured Glasses" written by Woldman A. Weyl and originally published in 1951 by the Society of Glass Technology, Sheffield, Dawson's of Pall Mall, London, p. 311, that too much zinc oxide is disadvantageous, because the glasses with a relatively high zinc oxide content do not strike, for in this case the equilibrium between the sulphides and the silicates of Cd and Zn causes the CdS concentration to remain within its solubility limits, for practically all the sulphide ions are tied up with zinc to form $ZnS_4$ anions.

However, the inventor of the present invention has found as a result of detailed researches that there exists a close relation between the amount of zinc oxide added and the absorption cut-off performance of the infrared transmitting glasses, and found that an infrared transmitting glass having a sharp cut-off performance in a region of relatively long wavelengths can be obtained by adding zinc oxide of an amount far beyond the conventional level.

SUMMARY OF THE INVENTION

Accordingly, it is the object of this invention to provide an infrared transmitting glass having a sharp cut-off performance in a region of relatively long wavelengths based upon a glass composition including a very high content of zinc oxide. Zinc oxide of an amount up to 20 percent has mainly an effect of suppressing the evaporation of the coloring agents such as CdS and Se, but the inventor of the present invention has found that if the amount of zinc oxide is increased beyond 20 percent or even beyond 28 percent or more by substituting it for silica, the position of the absorption cut-off limit is shifted to a region of a longer wavelength, provided that the contents of the coloring agents such as CdS and Se are also increased. Another object of this invention is to provide an infrared transmitting glass having a perfectly sharp cutoff performance in a visible region by introducing the amount of zinc oxide above 31 percent by weight.

The glass according to the present invention consists basically of $SiO_2$-$ZnO$-$R_2O$-$R'O$ system (R represents an alkali metal and R' represents an alkaline earth metal). The glass forming range of the conventional glasses of this system is shown by a dotted line in FIG. 1. However, by adding CdS and Se three times as much as those in the conventional CdS-CdSe glasses, a stable glass can be produced even at point A located outside of the conventional glass forming range. Thus, the glass forming range is extended by addition of much higher amounts of CdS and Se as shown by a solid line in FIG. 1. Furthermore, in this connection, it was found that glasses within this extended range show a sharp cut-off performance in a region of infrared wavelength when they have been applied an appropriate heat treatment such as heating the glasses at 600 to 660° C. for 5 to 10 hours and thereafter cooling them down steppedly.

Furthermore, though it is already known that tellurium has an effect of shifting the position of the absorption cut-off limit to a region of a longer wavelength when added to the conventional CdS-CdSe colored glasses, it is possible to obtain a glass having the absorption cut-off limit of 870 m$\mu$ by adding tellurium to the glass according to the present invention. Thus, the effect of tellurium on shifting the absorption cut-off limit to a region of a longer wavelength is most remarkably exhibited by adding it to the glass according to the present invention.

The glass according to the present invention may include other conventional components such as boron oxide, calcium oxide and barium oxide.

Silica should preferably be employed in an amount of 28–53 percent by weight. If it is less than the lower limit, a proper glass formation cannot be obtained, and if it is more than the upper limit, the shifting of the absorption cut-off limit to a region of a longer wavelength is not obtained and the evaporation of the coloring agents is activated. Boron oxide has an effect of improving the weather-resistance of the glass. It should preferably be employed in an amount of 1–10 percent by weight. The amount of zinc oxide should be in a range of 28–48 percent, by weight, to provide an infrared transmitting glass having a sharp cut-off performance in a region of longer wave length than conventional glasses. And then the amount of zinc oxide should be in a range of 31–48 percent by weight to provide an infrared transmitting glass having a perfectly sharp cut-off performance in a visible region which means a region of shorter wavelength than 780 m$\mu$. The amount of zinc oxide in a range of 32% by weight should be preferable to accomplish the second object of this invention. If it is too high, it becomes difficult to get glass formation, and if it is too low, the shifting of the absorption cut-off limit to a region of a longer wavelength is reduced. Calcium oxide and/or barium oxide are important for obtaining a stable glass and should preferably be employed in an amount of 1–12 percent by weight. Potassium oxide and/or sodium oxide are effective on promoting the melting of glass. However, too much of them reduces the chemical durability of the glass, and therefore, they should preferably be employed in an amount of 10–30 percent by weight. Cadmium sulfide makes the basic glass unstable and deteriorates its transmission property if it is too small in quantity, but it also deteriorates the transmission property if it is too large in quantity. Therefore, cadmium sulfide should preferably be employed in an amount of 1.8–3.5 percent by weight, because if it is too low, the basic glass becomes unstable to cause devitrification and the transmission property is deteriorated, while if it is too high, the transmission property is similarly deteriorated. The amount of tellurium should preferably be 0–0.2 percent by weight. If it is more than 2.0 percent, the transmission property is deteriorated.

BRIEF DESCRIPTION OF THE DRAWING

In the accompanying drawing.

DESCRIPTION OF THE PREFERRED EMBODIMENTS

Several examples of the infrared transmission glass according to the present invention are given below.

Example 1

An infrared transmission glass was prepared from a composition having the following formula by weight:

|  | Percent |
| --- | --- |
| $SiO_2$ | 31.0 |
| $B_2O_3$ | 3.9 |
| $ZnO$ | 40.0 |
| $CaO$ | 2.2 |
| $BaO$ | 1.0 |
| $K_2O$ | 15.4 |
| $Na_2O$ | 2.9 |
| $CdS$ | 2.4 |
| $Se$ | 1.2 |
| $Te$ | 0.8 |

Figure 1:
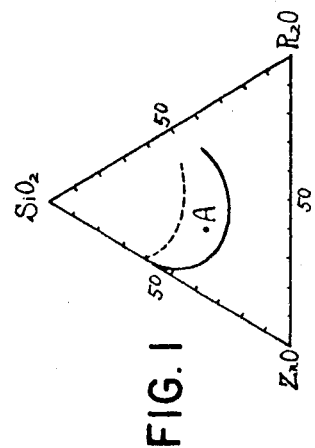
FIG. 1 shows a phase diagram of the ternary $SiO_2$-$ZnO$-$R_2O$ system in which a glass forming range by the prior art is expressed by a dotted line and that by the present invention is expressed by a solid line.

After a proper heat-treatment, the resulted infrared transmitting glass having a thickness of 2.5 mm. showed a transmission performance as indicated by curve 1 in FIG. 1, where the absorption cut-off limit was 870 m$\mu$ and the sharpness or which of cut-off was 60 m$\mu$.

Example 2

An infrared transmitting glass was prepared from a composition having the following formula by weight:

|  | Percent |
| --- | --- |
| $SiO_2$ | 29.3 |
| $B_2O_3$ | 3.8 |
| $ZnO$ | 39.7 |
| $CaO$ | 2.0 |
| $BaO$ | 3.7 |
| $K_2O$ | 14.2 |
| $Na_2O$ | 1.9 |
| $CdS$ | 2.8 |
| $Se$ | 2.6 |
| $Te$ | 0 |

After a proper heat-treatment, the resulted infrared transmitting glass having a thickness of 2.5 mm. showed a transmission performance as indicated by curve 1 in FIG. 1, where the absorption cut-off limit was 870 m$\mu$ and the sharpness or which of cut-off was 60 m$\mu$.

Example 3

An infrared transmitting glass was prepared from a composition having the following formula by weight:

|  | Percent |
| --- | --- |
| $SiO_2$ | 35.0 |
| $B_2O_3$ | 4.0 |
| $ZnO$ | 34.0 |
| $CaO$ | — |
| $BaO$ | 2.0 |
| $K_2O$ | 18.0 |
| $Na_2O$ | 2.0 |
| $CdS$ | 2.0 |
| $Se$ | 1.1 |
| $Te$ | 1.1 |

Figure 2:
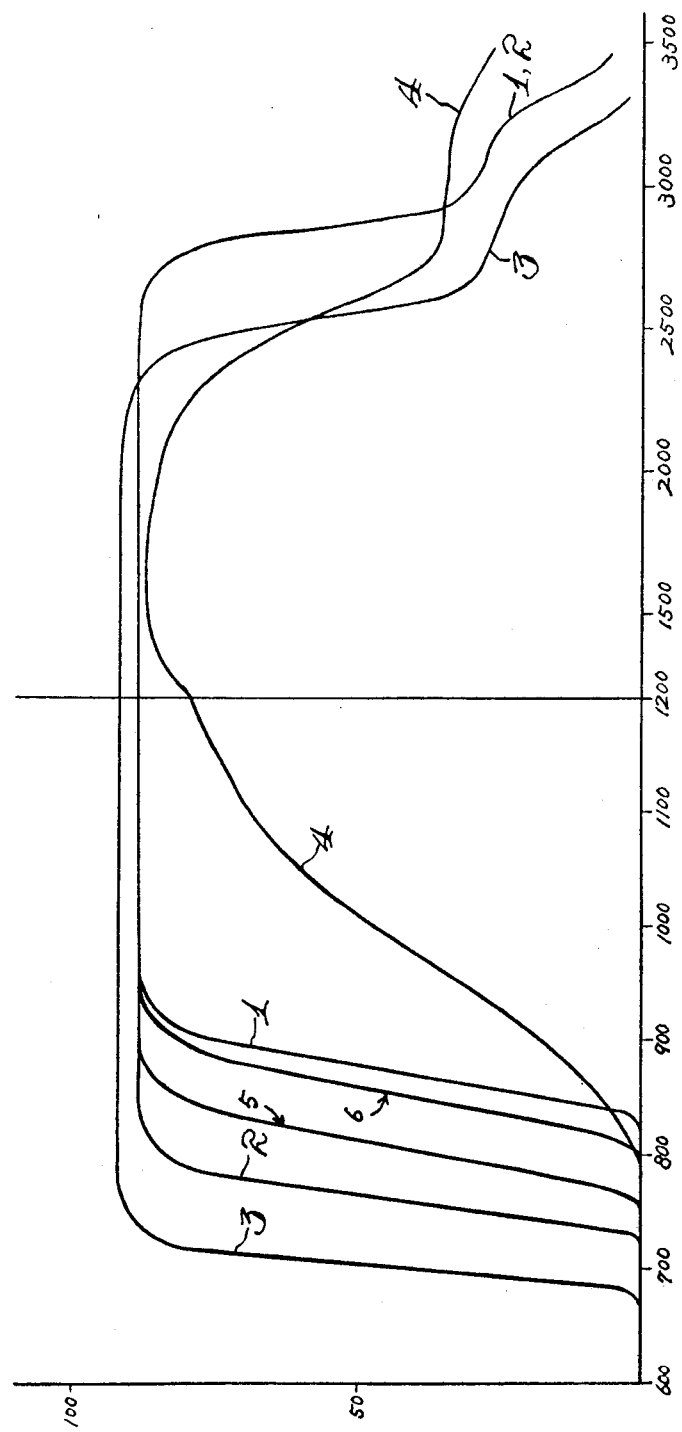
FIG. 2 shows the relationship between transmission and wavelength of two embodiments of an infrared transmitting glass according to the present invention (curves 1, 2, 5 and 6) and of two glasses according to the prior art (curves 3 and 4), wherein the curve 3 represents the transmission performance of the conventional CdS-CdSe color glass and the curve 4 represents that of the conventional manganese-chromium colored glass.

After a proper heat-treatment, the resulted infrared transmitting glass having a thickness of 2.5 mm. showed the absorption cut-off limit of 800 m$\mu$ and the sharpness or width of cut-off of m$\mu$ as indicated by curve 5 in FIG. 2.

Example 4

An infrared transmitting glass was prepared from a composition having the following formula by weight:

| | Percent |
|---|---|
| $SiO_2$ | 33.0 |
| $B_2O_3$ | 3.4 |
| ZnO | 36.5 |
| CaO | — |
| BaO | 2.0 |
| $K_2O$ | 17.6 |
| $Na_2O$ | 2.5 |
| CdS | 2.8 |
| Se | 1.1 |
| Te | 1.1 |

After a proper heat-treatment, the resulted infrared transmitting glass having a thickness of 2.5 mm. showed the absorption cut-off of 850 m$\mu$ and the sharpness or width of cut-off of 76 m$\mu$ as indicated by curve 6 in FIG. 2.

As clearly seen from the above examples, the glass according to the present invention cuts off completely visible rays while effectively transmitting infrared rays in a manner of highly sharp cutting-off at an absorption cut-off limit located in a region of wavelengths high enough for a strictly limited infrared transmissibility.

What is claimed is:

1. An infrared transmitting glass consisting, on the oxide basis by weight, of 28–53% $SiO_2$, 1–10% $B_2O_3$, 28–48% ZnO, 1.8–3.5% CdS, 1.0–3.0 Se, 0–2.0% Te,
   (a) a member selected from the group consisting of CaO, BaO and their mixture in an amount from 1–12%, and
   (b) a member selected from the group consisting of $K_2O$, $Na_2O$ and their mixture in an amount from 10–30%, the total weight of the composition amounting to 100 percent by weight, said glass having an absorption cut-off of at least 750 m$\mu$.

2. An infrared transmitting glass according to claim 1, wherein ZnO content is higher than 31% on the same oxide basis by weight.

3. An infrared transmitting glass according to claim 2, which has a perfectly sharp cut-off performance in a shorter region of 780 m$\mu$.

4. An infrared transmitting glass according to claim 2, which consists of the same composition as Example 4.

References Cited

UNITED STATES PATENTS

| | | | |
|---|---|---|---|
| 1,864,858 | 6/1932 | Rising | 106—54 |
| 1,995,952 | 3/1965 | Taylor | 106—54 |
| 2,230,199 | 1/1941 | Dobrovolny | 106—52 |
| 2,252,131 | 8/1941 | Lyle | 106—52 |
| 2,416,392 | 2/1947 | Hood | 106—52 |
| 2,418,684 | 4/1947 | Youel | 106—52 |
| 3,291,585 | 12/1966 | Okamura | 106—52 |
| 3,527,649 | 9/1970 | Sullivan | 106—48 |

FOREIGN PATENTS

| | | | |
|---|---|---|---|
| 19,402 | 8/1968 | Japan | 106—54 |
| 1,490,974 | 8/1966 | France | 106—54 |

OTHER REFERENCES

Weyl, W. A.: Colored Glasses, Society of Glass Technology, Sheffield, England, 1967, pp. 270–275 and 311.

ALLEN B. CURTIS, Primary Examiner

M. L. BELL, Assistant Examiner

U.S. Cl. X.R.

252—300